United States Patent
Thies et al.

(10) Patent No.: US 7,631,736 B2
(45) Date of Patent: Dec. 15, 2009

(54) ACTUATOR FOR AN ACTIVE CHASSIS OF A MOTOR VEHICLE

(75) Inventors: Andreas Thies, Friedrichshafen (DE); Uwe Wohanka, Uhldingen-Muhlhofen (DE); Christoph Pelchen, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 214 days.

(21) Appl. No.: 11/636,685

(22) Filed: Dec. 8, 2006

(65) Prior Publication Data

US 2007/0132197 A1   Jun. 14, 2007

(30) Foreign Application Priority Data

Dec. 10, 2005   (DE) .................. 10 2005 059 117

(51) Int. Cl.
    *F16F 7/10* (2006.01)
(52) U.S. Cl. .................................. 188/380; 280/5.507
(58) Field of Classification Search ............. 280/5.511, 280/5.517, 124.101, 124.106, 124.107, 124.152, 280/124.166, 124.169, 5.515; 267/274, 276; 188/378, 379, 380, 266.1, 266, 313
    See application file for complete search history.

(56) References Cited

U.S. PATENT DOCUMENTS

| 5,810,335 A | 9/1998 | Wirtz et al. |
| 5,823,517 A | 10/1998 | Huang et al. |
| 5,950,996 A | 9/1999 | Pradel |
| 6,249,728 B1 * | 6/2001 | Streiter ..................... 280/5.514 |
| 6,467,748 B1 * | 10/2002 | Schick et al. ............... 267/136 |
| 6,830,122 B2 | 12/2004 | Kroppe |
| 7,316,303 B2 * | 1/2008 | Smith ......................... 188/312 |
| 2005/0070391 A1 | 3/2005 | Folsom et al. |

FOREIGN PATENT DOCUMENTS

| DE | 44 28 605 A1 | 4/1995 |
| DE | 195 29 580 A1 | 2/1997 |
| DE | 196 04 558 C1 | 8/1997 |
| DE | 196 06 991 A1 | 8/1997 |
| DE | 100 43 711 A1 | 5/2002 |
| DE | 102 27 416 A1 | 1/2004 |
| DE | 10 2004 009 113 A1 | 9/2004 |
| DE | 103 06 228 A1 | 9/2004 |
| JP | 04-129837 | 4/1992 |
| JP | 07-164926 | 6/1995 |

* cited by examiner

*Primary Examiner*—Melanie Torres
(74) *Attorney, Agent, or Firm*—Davis & Bujold, P.L.L.C.

(57) ABSTRACT

An actuator for an active chassis of a motor vehicle is proposed which includes a body spring and a vibration damper, and which incorporates a hydraulic or pneumatic positioning cylinder (3) and a compensation spring (2). The actuator (1) is so designed and positioned that the static body mass (13) is borne by the compensation spring (2).

11 Claims, 1 Drawing Sheet

ACTUATOR FOR AN ACTIVE CHASSIS OF A MOTOR VEHICLE

This application claims priority from German Application Serial No. 10 2005 059117.5 filed Dec. 10, 2005.

FIELD OF THE INVENTION

This invention involves an actuator for an active chassis of a motor vehicle.

BACKGROUND OF THE INVENTION

The design of a conventional chassis for a motor vehicle represents a compromise between driving safety and driving comfort, since a hard damping guarantees good handling and a soft damping increases comfort. In order to be able to combine both aspects, active chasses for compensating for shaking, pitching and piston stroke movements are known from the state of the art.

A spring-shock absorber device for a motor vehicle is known from German Patent 196 06 991 A1 in which the separation of the vehicle body from the wheels can be controlled by a hydraulic unit according to the driving behavior of the vehicle, whereby the spring is clamped between a moving element of the hydraulic unit and a damping cylinder of the shock absorber, and the moving element of the hydraulic unit is placed in a sliding manner on the shock absorber such that the displacement only occurs in the area of the piston rod of the shock absorber, whereupon the friction forces are largely reduced during the displacement of the moving element.

A piston-cylinder unit is also known form German Patent 196 04 558 C1 and includes a cylinder in which a piston rod is positioned to move axially, a first connection device in an active connection with the cylinder; a second connection device, which is connected with the piston rod; a positioning cylinder with a pressure medium connection, whereby the positioning cylinder is in an operative connection with one of the connection device and by means of adding or removing the pressure medium, the separation between the first and the second connection devices can be adjusted. In the process the positioning cylinder is placed in series with the cylinder and the piston rod represents a guide track for the positioning cylinder.

In addition, an adjustable spring strut for motor vehicles is known from German Patent 195 29 580 A1, which enables a good position control of the spring-loaded vehicle parts and is supposed to manifest a defined, controllable, and tunable damping and cushioning rate. The spring strut includes a vibration damper surrounded by a coil spring with a damping cylinder, whereby the coil spring is so held and tensioned, on the one hand, by an initial spring plate connected by an external and an internal positioning cylinder concentrically surrounding the damping cylinder and, on the other hand, by a second spring plate connected with the piston rod in the vicinity of the articulation point of the piston rod of the operating piston so that when the piston is withdrawn into the damping cylinder the coil spring is tensioned. In the process, the two positioning cylinders to change the ground clearance of the car body are constructed so as to move in a telescoping manner in relation to each other.

In the construction known from German Patent 195 29 580 A1, the first spring plate is secured to the external positioning cylinder, whereby the external positioning cylinder manifests on its end facing the piston rod devices to guide and seal the damping cylinder and on the opposite end devices to guide and seal the internal positioning cylinder. In the process, the internal positioning cylinder is secured to the damping cylinder and displaces in a telescope manner relative to the external positioning cylinder by the introduction of a pressure medium into the ring-shaped, interior space bounded by the positioning cylinders and the damping cylinder.

In the framework of German Patent 100 43 711 A1, an actuator for active vehicle chassis control is described using a positioning member that produces a torque, which is connected with guides on the wheel and on the vehicle body, whereby the positioning device is placed between the vehicle body and the guides and conveys a torque to the guides corresponding to the shaking and pitch compensation and/or a torque guaranteeing the damping of the guide oscillations. The positioning device is preferably constructed as a swivel motor.

Another actuator for active vehicle chassis control is known from German Patent 103 06 228 A1. It includes a positioning device placed between the wheel and the vehicle body which compensates for pitch and shaking movements and also reduces the piston stroke movements according to the skyhook principle. The positioning device is constructed as a swivel motor and also, between the wheel and the vehicle body, makes an actuation moment available to reduce the body piston stroke movements in addition to an actuation moment for the shaking and pitch compensation.

The energy requirement for the constructions known from the state of technology is disadvantageously high because of the displacement of the base of the suspension system and the activation of the actuator.

This invention is based upon the objective of providing an actuator for an active chassis to influence the pitch, piston stroke and shaking movements for active chassis control, whose energy requirement is slight in comparison to systems known from the state of technology.

SUMMARY OF THE INVENTION

Accordingly, an actuator which forms part of an active chassis to influence the pitch, piston stroke and shaking movements is proposed in which the active chassis includes a body spring, a vibration damper, and the actuator; the actuator comprises both a hydraulic or a pneumatic positioning cylinder and a compensation spring, whereby the actuator is so designed that the static body mass is borne by the compensation spring. In this manner, the hydraulic or pneumatic positioning cylinder only applies additional forces so that the energy requirement is advantageously small because of the small need for actuation forces.

Because of the hydraulic or pneumatic positioning cylinder, the body motions are reduced by the application of additional pulling and pressing forces, whereby the stationary basic load or the body mass is compensated for or borne by the compensation spring preferably aligned parallel to the positioning cylinder. The actuator is positioned between the body mass and the masses without springs, and is connected in series with the body spring.

In vehicles with a low load, transmission-ratio spread, the compensation spring can be constructed as a conventional steel spring; for larger load, transmission-ratio spreads, for example in trucks, the compensation springs of the actuator and/or the body springs can be constructed as pneumatic springs or hydro-pneumatic springs which serve to control leveling, whereby the stationary offset (basic load) of the positioning cylinder is set to zero. The construction of the compensation spring as a pneumatic spring or a hydro-pneumatic spring also results in the advantage that the same positioning paths for the hydraulic or pneumatic positioning cylinders are always available.

BRIEF DESCRIPTION OF THE DRAWING

The invention will now be described, by way of example, with reference to the accompanying drawing in which.

DETAILED DESCRIPTION OF THE INVENTION

Figure 1:
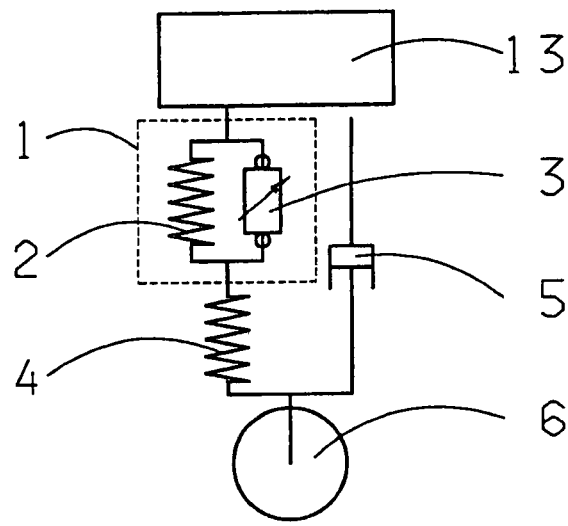
FIG. 1 is a schematic representation of an actuator of the invention for an active chassis.

As illustrated in FIG. 1, an actuator 1 which forms part of the invention for an active vehicle chassis to influence pitch, piston stroke and shaking movements, in which the active chassis contains a body spring 4, a vibration damper 5, and includes the actuator which comprises a hydraulic or pneumatic positioning cylinder 3 and a compensation spring 2, preferably positioned parallel to the positioning cylinder 3, and is so designed and constructed that a static body mass 13 is borne by the compensation spring 2, so that the positioning cylinder 3 only applies the supplemental forces which are required to reduce the body movements. According to the invention, the compensation spring 2 is connected parallel to the positioning cylinder 3 and compensates for the stationary basic load or bears the body mass 13.

As can also be seen in FIG. 1, the actuator 1 is positioned between the body mass 13 and the masses without springs 6 and is connected in series with the body spring 4; the vibration damper 5 is connected parallel to the actuator 1 and to the body spring 4.

As already explained, the compensation spring is constructed as a conventional steel spring in vehicles with a low load transmission-ratio spread; for vehicles with a larger load transmission-ratio spread, the compensation springs and/or the body springs are preferably constructed as pneumatic springs or hydro-pneumatic springs.

Figure 2:
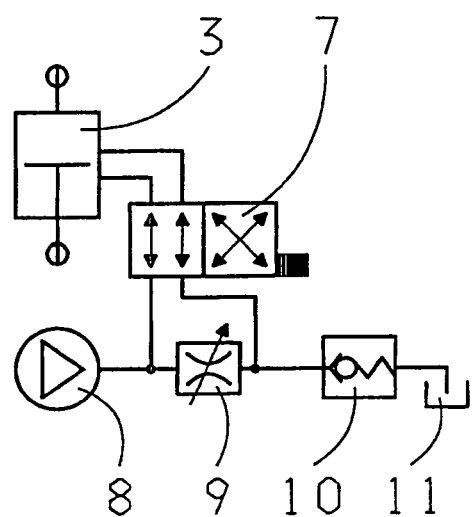
FIG. 2 is schematic representation of an arrangement for controlling a hydraulic positioning cylinder of the actuator of the invention for an active vehicle chassis.
Figure 3:
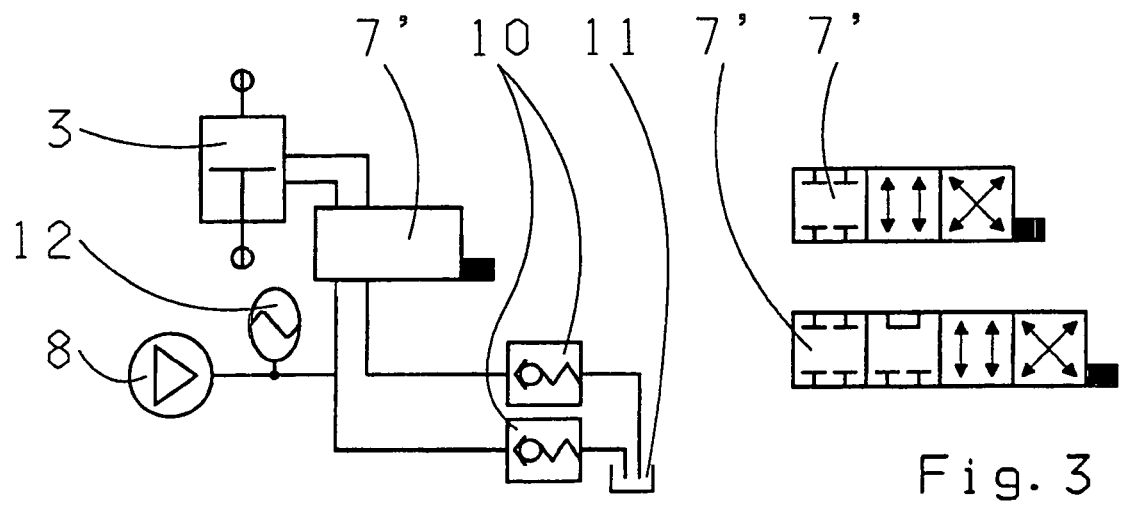
FIG. 3 is a schematic representation of another execution model of the arrangement to control a hydraulic positioning cylinder of the actuator of the invention.

In FIGS. 2 and 3, two advantageous possibilities of the arrangement to control the actuator of the invention via the hydraulic positioning cylinder are shown. Naturally, there are other arrangements known to the expert.

In the embodiment of FIG. 2, a system pressure is needed in an advantageous manner, whereby each wheel requires its own hydraulic supply.

Accordingly, a tank is designated as 11, a pressure limiting valve before the tank as 10 and a required proportional valve as 9. The hydraulic fluid is supplied from the hydraulic supply or pump 8 through an appropriate regulation setting of the proportional valve 9 and an appropriate connection of a distributing valve 7, which is associated with each wheel to the positioning cylinder 3. In the embodiment shown in FIG. 2, the distributing valve 7 is required for each wheel. It is also possible to provide a distributing valve for each vehicle axle in an appropriate arrangement.

In the embodiment in accordance with FIG. 3, a high system pressure is required whereby a central hydraulic supply is possible in an advantageous manner so that all wheels require a distributing valve 7'. In the process the hydraulic fluid is sent from the pump 8 to a hydraulic reservoir 12 which is connected downstream and then through the distributing valve 7' to the positioning cylinder 3. In this particular arrangement, two lines to the tank 11 are required with appropriate pressure limiting values 10. Two possibilities for constructing the distributing valve 7' are shown in the right part of FIG. 3.

An actuator is made available by the concept of this invention whose energy requirement is low compared to the energy requirement of the systems known in the state of technology. In addition, the manufacturing costs and assembly costs are low.

Naturally every construction design, in particular every spatial arrangement of the construction components of the actuator of the invention for an active vehicle chassis, as well as the arrangement to control the positioning cylinder, is covered in itself as well as in its relation to one other in so far as technically feasible by the protective scope of these claims without influencing the function of the actuator, as stated in the claims, even when the design is not explicitly covered in the Figures and in the description.

Reference Numerals
1 actuator
2 spring/compensation spring
3 hydraulic positioning cylinder
4 spring/body spring
5 vibration damper
6 (wheel) masses without springs
7 switching valve/distributing valve
7' switching valve/distributing valve
8 hydraulic supply/pump
9 proportional valve
10 pressure limiting valve
11 tank
12 hydraulic reservoir
13 body mass

The invention claimed is:

1. An actuator of an active chassis of a motor vehicle, the active chassis comprising:
   a body spring (4) being coupled to at least one unsprung mass,
   a vibration damper (5) coupling the vehicle chassis to the at least one unsprung mass, and
   the actuator (1) comprising:
      a compensation spring (2), and
      one of a hydraulic and a pneumatic positioning cylinder (3),
   a first end of the actuator (1) being coupled to the vehicle chassis and an opposite second end of the actuator (1) being coupled to the body spring (4); and
   the compensation spring (2) of the actuator (1) bearing a static body mass (13) of the vehicle.

2. The actuator of the active chassis of the motor vehicle according to claim 1, wherein the compensation spring (2) is connected in parallel with the positioning cylinder (3) such that the compensation spring (2) normally bears the body mass (13).

3. The actuator of the active chassis of the motor vehicle according to claim 1, wherein the actuator (1) is positioned between the body mass (13) and the at least one unsprung mass (6), and the actuator (1) is connected in series with the body spring (4).

4. The actuator of the active chassis of the motor vehicle according to claim 1, wherein the compensation spring (2) is a conventional steel spring.

5. The actuator of the active chassis of the motor vehicle according to claim 1, wherein the compensation spring (2) is one of a pneumatic spring and a hydro-pneumatic spring.

6. The actuator of the active chassis of the motor vehicle according to claim 1, wherein each of a plurality of wheel of the vehicle has an active chassis and each actuator (1) includes the hydraulic positioning cylinder, each of the positioning cylinders (3) of the plurality of wheels is supplied with hydraulic fluid from one of a hydraulic supply and a pump (8), and control of the supply of hydraulic fuild is controlled, by way of an appropriate adjustment of a proportional valve (9) and an appropriate connection of a distributing valve (7).

7. The actuator of the active chassis of the motor vehicle according to claim 1, wherein each of a plurality of wheel of the vehicle has an active chassis and each actuator (1) includes the hydraulic positioning cylinder constructed such that a central hydraulic supply is provided at high system pressure and a distributing valve (7') is needed for all of the plurality of wheels, and a hydraulic flow is sent from a pump (8) to a hydraulic reservoir (12) connected downstream, and then is sent to the respective positioning cylinder (3) through the respective distributing valve (7').

8. The actuator of the active chassis of the motor vehicle according to claim 6, wherein the distributing valve (7) is a two way valve.

9. The actuator of the active chassis of the motor vehicle according to claim 7, wherein the distributing valve (7') is a two way valve.

10. An actuator forming part of an active chassis for a wheel supported by a vehicle chassis of a motor vehicle, the active chassis comprising:
   a body spring (4) being coupled to the wheel,
   a vibration damper (5) directly coupling the vehicle chassis to the wheel, and
   the actuator (1) having a first end thereof coupled to the vehicle chassis and an opposite end thereof coupled to the body spring (4), and the actuator (1) comprising:
   a compensation spring (2), and
   one of a hydraulic and a pneumatic positioning cylinder (3),
   the actuator (1) and the body spring (4) being connected in parallel with the vibration damper (5); and
   the compensation spring (2) of the actuator (1) bearing a static body mass (13) of the vehicle while the positioning cylinder (3) compensating for supplemental forces.

11. An actuator forming part of an active chassis for a wheel supported by a vehicle chassis of a motor vehicle, the active chassis comprising:
   a body spring (4) being coupled to the wheel,
   a vibration damper (5) directly coupling the vehicle chassis to the wheel, and
   the actuator (1) having a first end thereof coupled to the vehicle chassis and an opposite end thereof coupled to the body coil spring (4), and the actuator (1) comprising:
   a compensation coil spring (2) being connected in parallel one of a hydraulic and a pneumatic positioning cylinder (3),
   the actuator (1) and the body coil spring (4) being connected in series with one another but in parallel with the vibration damper (5); and
   the compensation coil spring (2) of the actuator (1) bearing a static body mass (13) of the vehicle while the positioning cylinder (3) only compensating for supplemental forces.

* * * * *